(12) United States Patent
Nicholson et al.

(10) Patent No.: US 10,201,774 B2
(45) Date of Patent: Feb. 12, 2019

(54) SUSPENDABLE FILTER BAG SYSTEM

(71) Applicant: Primex Process Specialists, Inc., Doylestown, PA (US)

(72) Inventors: Stewart Nicholson, Doylestown, PA (US); Mary A. Quinlan, Doylestown, PA (US)

(73) Assignee: Primex Process Specialists, Inc, Warrington, PA (US)

( * ) Notice: Subject to any disclaimer, the term of this patent is extended or adjusted under 35 U.S.C. 154(b) by 0 days.

(21) Appl. No.: 15/484,602

(22) Filed: Apr. 11, 2017

(65) Prior Publication Data
US 2017/0216751 A1  Aug. 3, 2017

Related U.S. Application Data

(63) Continuation of application No. 14/627,949, filed on Feb. 20, 2015.

(60) Provisional application No. 61/942,445, filed on Feb. 20, 2014.

(51) Int. Cl.
*B01D 46/02* (2006.01)
*B01D 46/00* (2006.01)

(52) U.S. Cl.
CPC ......... *B01D 46/02* (2013.01); *B01D 46/0001* (2013.01); *B01D 46/0005* (2013.01)

(58) Field of Classification Search
CPC .... B01D 46/02; B01D 46/06; B01D 46/0068; B01D 46/0005; B01D 46/0067; B01D 29/27; B01D 39/1623

USPC .......... 55/378, 374, 381, 363, 382; 210/238, 210/448, 452, 470, 453, 488
See application file for complete search history.

(56) References Cited

U.S. PATENT DOCUMENTS

| | | | | |
|---|---|---|---|---|
| 2,308,682 | A * | 1/1943 | Fuge | A47L 9/14 24/30.5 R |
| 3,877,901 | A * | 4/1975 | Snyder | B01D 46/0005 55/304 |

* cited by examiner

*Primary Examiner* — Duane Smith
*Assistant Examiner* — Minh Chau T Pham
(74) *Attorney, Agent, or Firm* — Douglas J. Ryder; Ryder, Mazzeo & Konieczny LLC

(57) ABSTRACT

A bag house filter bag is suspended vertically from a separable hanger. The filter bag has a closure at the top, which is constructed by a series of tucks and folds. The closure also provides a support loop for engagement with the hanger. The filter bag is constructed mainly of woven fabric formed into a cylinder. The folding and stitching pattern of the fabric at the top end enables the bag to transition from linear at the site of the support loop to cylindrical with an even distribution of stress on the fabric. The hanger includes a cross member and a surrounding tube to reduce specific stress on the fabric. The hanger has a removable joint opening clasp at one end of the cross member to enable rapid insertion and removal of the hanger from within the suspension tube without contact, removal or other disturbance of the filter bag.

20 Claims, 9 Drawing Sheets

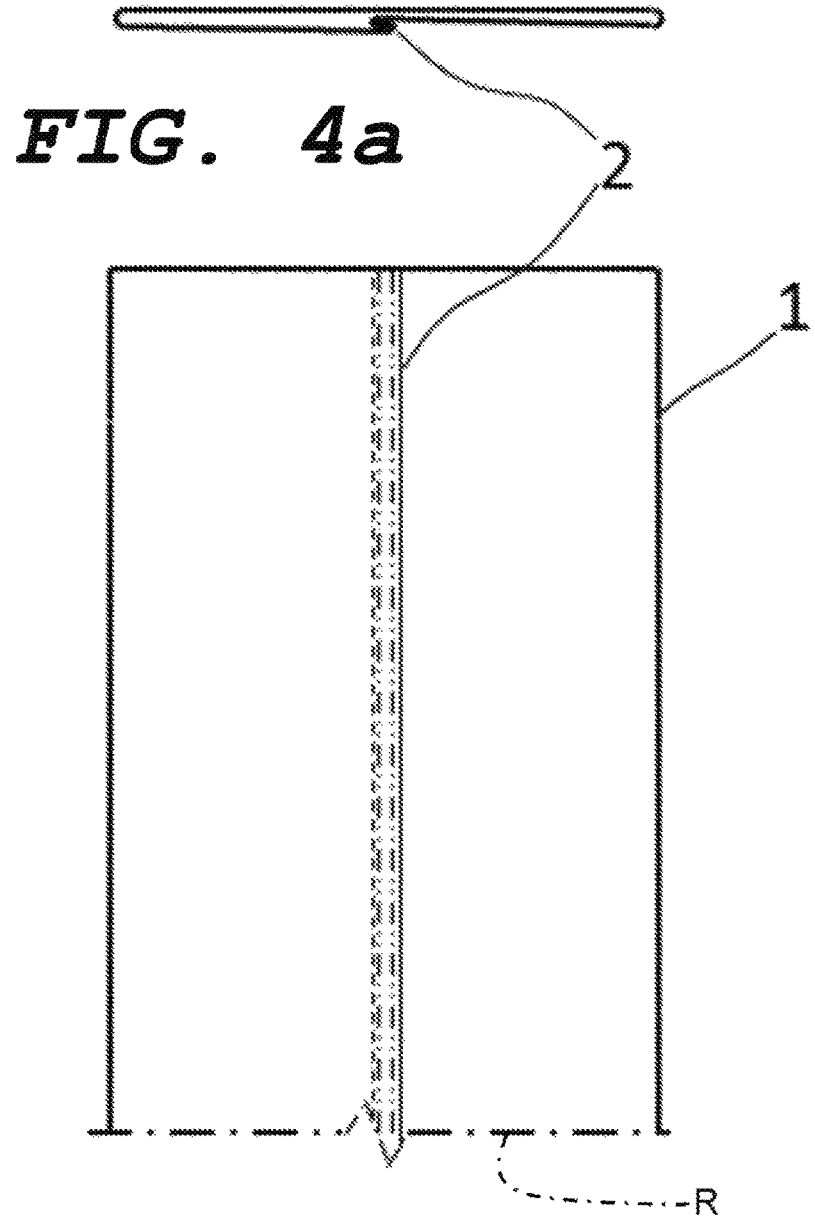

FIG. 5a  3 (TYPICAL)
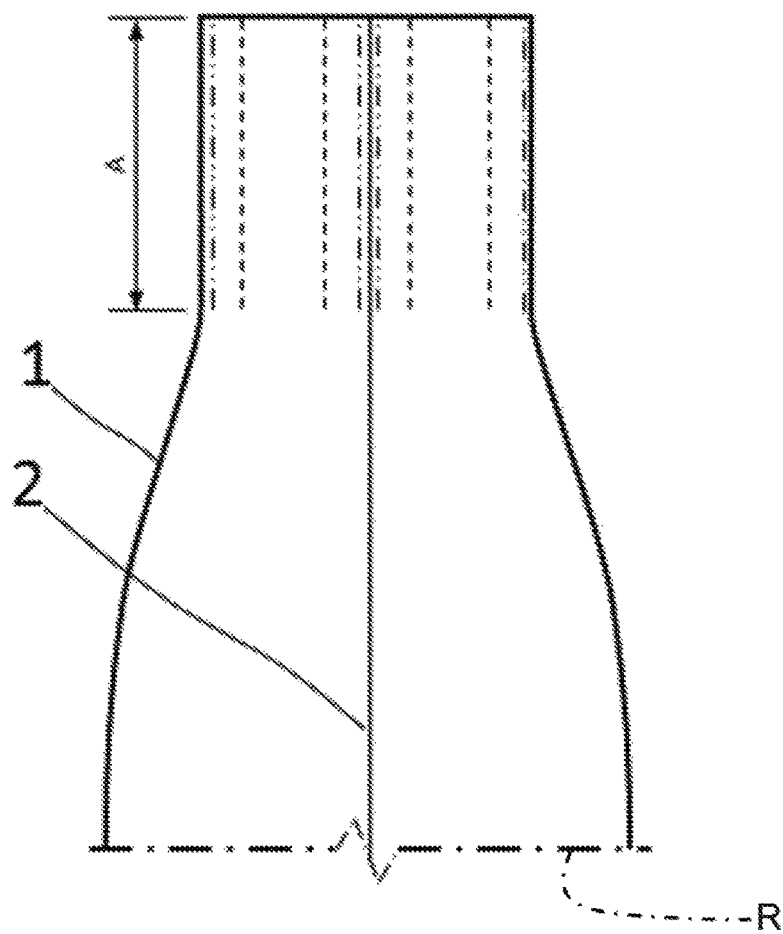
FIG. 5b

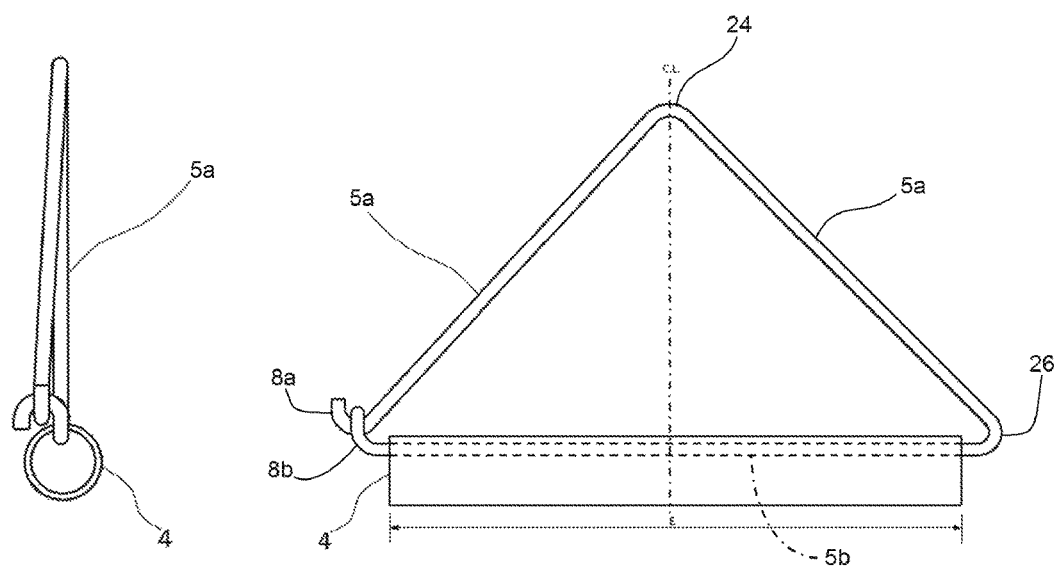
*FIG. 7a*  *FIG. 7b*

SUSPENDABLE FILTER BAG SYSTEM

CROSS REFERENCE TO RELATED APPLICATIONS

This application is a continuation of U.S. application Ser. No. 14/627,949 filed Feb. 20, 2015 entitled "Suspendable Filter Bag System" (now abandoned), which is a non-provisional of U.S. provisional application No. 61/942,445 filed on Feb. 20, 2014 entitled "Filter Bag Suspension System," priority from both is hereby claimed.

FIELD OF THE INVENTION

The present invention relates to flue gas filtration at power generating facilities. More specifically, this invention relates to "dry" or "semi-dry" flue-gas desulfurization ("FGD") systems that include a "reverse air" type fabric filter to remove particulate matter from the flue gas prior to atmospheric emission.

BACKGROUND OF THE INVENTION

Compliance with environmental regulations at facilities equipped with dry or semi-dry FGD processes requires removal of particulate matter from the flue gas at a location between the FGD process and emission point. The particulate matter entrained in the flue gas at this location typically consists of solid by-products of the combustion and FGD process including fly ash, partially-burned fuel, and various compounds of sulfur, chlorine, calcium and sodium.

Many dry or semi-dry FGD systems include "reverse air" type fabric filters to remove particulate matter. Reverse air type fabric filters typically utilize multiple cylindrical filter bag assemblies, each comprised of a fine mesh filter fabric with an integral metal filter cap. The metal filter cap encloses the top end of the filter bag, thereby enabling the assembly to be suspended vertically within the bag house compartment. In the prior art, corrosion and subsequent failure of the filter cap typically causes irreparable filter bag damage, excessive particulate matter emission, unplanned decreases in power plant output, and excessive maintenance costs. Moreover, replacement of the integral filter cap (as a preventive maintenance action) typically necessitates replacement of the entire filter bag assembly, thereby adding to corrective maintenance costs.

Therefore, there is a need in the art for an alternative suspendable filter bag device that is corrosion resistant and replaceable independently of the filter bag. There is also a need for a filter bag and suspension system which is durable, economical and requires less maintenance.

SUMMARY OF THE INVENTION

In order to meet the need in the art as explained above, a suspendable filter bag system has been devised that replaces the integral metal filter cap with a novel releasable hanger depicted in the following figures of drawing. Generally speaking, the filter bag is composed of woven fabric and has a top, sides and a bottom including an opening at the bottom for receiving unfiltered flue gas. The air filter bag is substantially cylindrical, formed in part by a longitudinal seam which joins side edges of the bag fabric. A closure at the top of the bag is comprised of a lateral fold of gathered fabric. Before folding, pleats are added to reduce fabric stress concentration and to reduce its length. The pleats are then folded and stitched at the ends to form a series of tucks along a more or less linear top edge of gathered fabric. The gathered top edge is then folded over and stitched to the remainder of the bag along a lateral seam below the fold. This construction forms a single, elongate, laterally extending loop of fabric, which is open at the ends and approximately equal in length to the diameter of the cylindrical portion of the bag. The cylindrical shape of the remainder of the bag below is maintained by a series of vertically spaced rigid rings connected along the inside wall of the bag.

The bag is suspended from the loop by a hanger, which connects the loop to a bag house hook above it. The hanger has a cross member that passes through the loop. The hanger is substantially triangular including an apex at the top and two side arms which terminate at ends of the cross member at the bottom. Two hooks, one at the end of one of the arms and another at the end of the connecting cross member, form a releasable hook and catch joint, which can be opened to accept the cross member into the bag loop and then reclosed to secure the bag to the hanger. Conversely the hooks can be disengaged to allow the removal of the hanger from the bag. Both hooks are integral with the hanger, which is formed by shaping a unitary length of heavy gauge metal wire. The hooks are preferably oriented perpendicular to one another. Stress between the loop fabric and the cross member is reduced by a tube placed over the cross member that spreads the weight of the bag across a larger area of greater radius. The tube is preferably at least as long as the fabric loop.

In this respect, before explaining at least one embodiment of the invention in detail, it is to be understood that the invention is not limited in its application or to the details of construction in the following description or illustrated in the drawings. The invention is capable of other embodiments and of being carried out in various ways.

BRIEF DESCRIPTION OF THE DRAWINGS

FIGS. 4a and 4b are a front elevational view and a top plan view, respectively, of the filtration bag of FIG. 1 in an initial condition in accordance with the method of manufacturing by folding and stitching of one embodiment of the present invention;

FIGS. 5a and 5b are a front elevational view and a top plan view, respectively, of the filtration bag of FIG. 1 in an intermediate condition in accordance with the method of manufacturing by folding and stitching of one embodiment of the present invention;

FIGS. 7a and 7b are a side elevational view and a front elevational view, respectively, of the suspension hanger of FIG. 1;

DETAILED DESCRIPTION OF PREFERRED EMBODIMENTS

Figure 1:
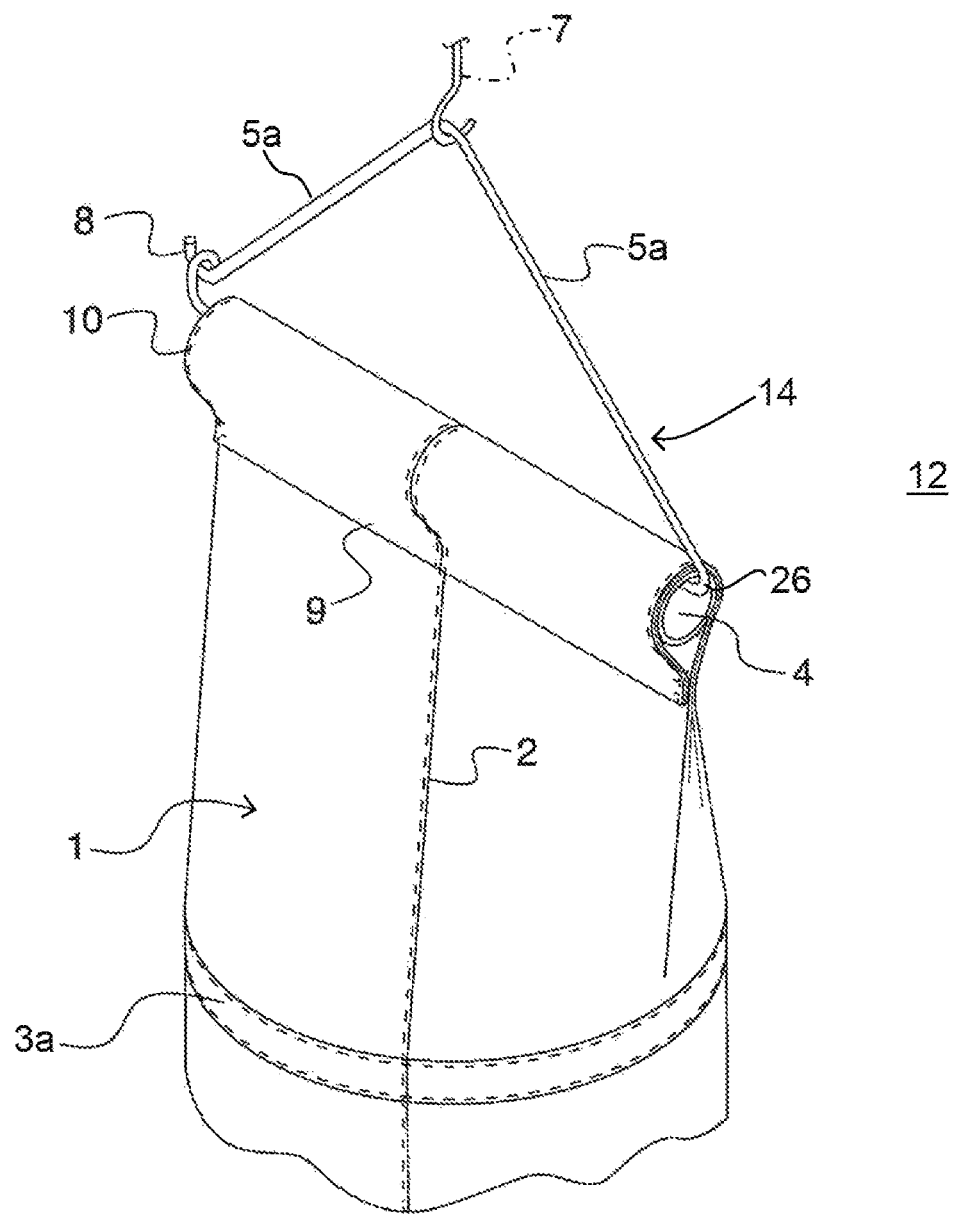
FIG. 1 is a left, top, front perspective view of an apparatus in accordance with one embodiment of the invention.

A suspendable filtration device in accordance with an embodiment of the invention is illustrated in FIG. 1 and is designated generally be reference numeral 12. The device 12 generally comprises a filter bag 1 and a suspension hangar 14. In the embodiment shown in FIG. 1-3, the filtration device is shown suspended from the ceiling 20 of a bag house by a ceiling hook 7.

The suspension hanger 14 comprises an elongate rigid member 5, which is formed into a triangular shape having two side arms 5a and a cross member 5b. As best seen in FIG. 7, the side arms 5a are integrally connected at an upper vertex 24. The cross member 5b is integrally formed with one side member at a lower vertex 26 and is oriented generally parallel to the plane of the bag house ceiling 20 when properly suspended.

The hangar 5 is not integrally formed at the third vertex. Instead, the hangar 5 includes a releasable joint 8, which releasably connects the free ends of the rigid member 5. In this embodiment, a releasable joint 8 comprises a u-shaped hook 8a formed at one end of the rigid member 5 and a u-shaped catch 8b formed at the other end of the rigid member 5. The hook 8a and catch 8b are oriented in opposite directions so as to enable releasable interconnection as best seen in FIGS. 1 and 7. When the joint 8 is disconnected, the cross member 5b can be inserted through or released from a tube 4, which supports the filter bag 1. When the joint is connected, the filtration bag and tube are securely suspended from the hangar 14.

The tube 4 passes through a loop 10 formed at the top of the filter bag 1 for suspending the filtration bag 1. The loop 10 also forms a filter bag closure, which is formed, as described in more detail below, by folding over gathered fabric at the top of the bag and stitching it to the remainder of the bag along lateral seam 9 below the fold.

Figure 2:
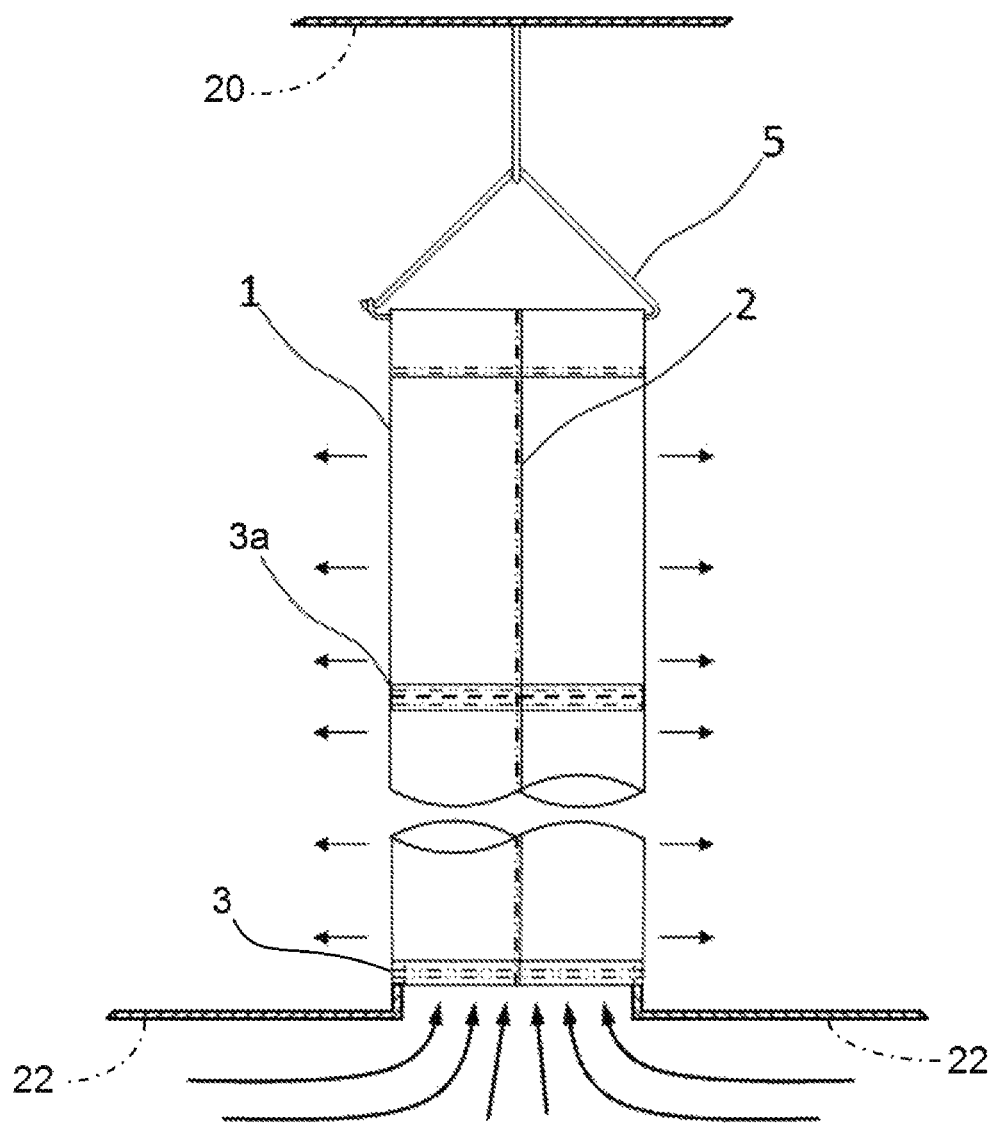
FIG. 2 is a front elevation of the apparatus of FIG. 1 schematically shown installed in a bag house.
Figure 3:
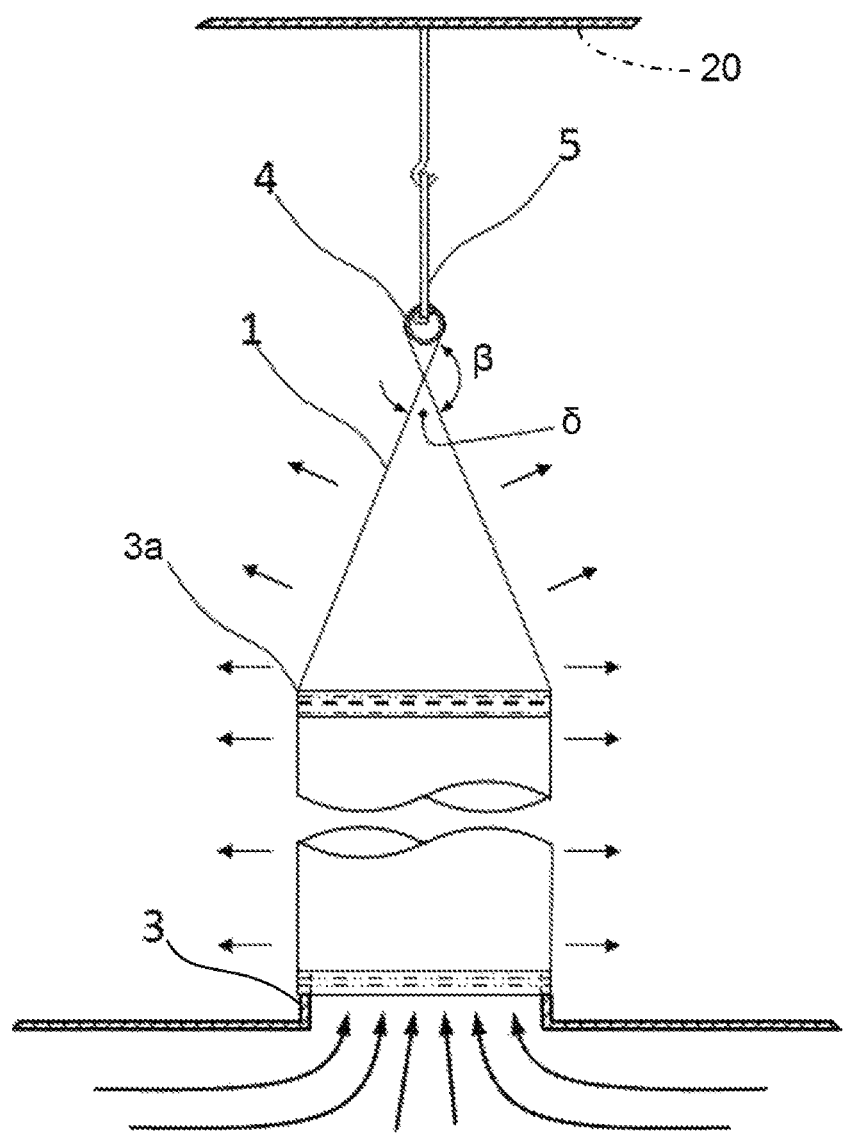
FIG. 3 is a side elevation of the apparatus of FIG. 1 schematically shown installed in a bag house.

Referring to FIGS. 2 and 3, the filtration device 12 is constructed and arranged to be suspended and contained within a bag house or similar enclosure through which flue gas is induced to flow by fan, draft or other pressure differential means. The filtration device 12 is arranged vertically such that unfiltered flue gas enters the filter bag 1 interior in a vertically upward direction as indicated by the lower, vertically-upwardly projecting fluid flow lines of FIGS. 2 and 3, and exits the filter bag through the side walls as indicated by the upper horizontally and/or horizontally-upwardly projecting fluid flow lines. The filter fabric and surface area of the filter bag 1 are selected to separate particulate matter from the flue gas stream with a separation efficiency, particle size classification and pressure differential suited to the specific application.

The filter bag 1 is constructed principally of an elongate strip of woven filter fabric. The elongate edges of the fabric are overlapped and stitched along a longitudinal seam 2 to form a cylinder or tube having the requisite circumferential strength. Circular former ring(s) 3 are sewn into external pockets at regular intervals along the length of filter bag 1. The interval between each circular former ring 3 is selected to prevent substantial deformation of the filter fabric cylindrical shape during operation. The filter bag 1 is suspended by the hangar 5 on the bag house ceiling hook 20.

The region of the filter bag 1 above the uppermost former ring 3a is folded and stitched in an important manner and serves several functions including: (1) transitioning the bag cross-sectional shape from circular to linear; (2) enclosing fully the uppermost end; and, (3) permitting insertion of a suspension apparatus such as the suspension tube 4 and hanger 5. The construction of the filter bag 1 in the region above the uppermost former ring 3 is further optimized to minimize stress throughout the entire filter bag 1, and most particularly in the region above the uppermost former ring 3 at which the cross-sectional shape transitions from circular to linear. Important construction parameters include the quantity and arrangement of the tucks and the tuck dimensions. The dimensions are selected so that the sum of the exterior angle beta ($\beta$) and adjacent interior angle delta ($\delta$) is 180 degrees.

Referring to FIGS. 4-6, the construction of filter bag 1 in the region above a reference line (located near and above the uppermost former ring 3a of FIG. 1) is shown in three sequential steps with the filter fabric laid flat. In a first step shown in FIGS. 4a and 4b, the filter fabric is folded and stitched along a longitudinal seam 2 in a "French fell" or similar pattern. The seam 2 is preferably located along the longitudinal centerline of the filter bag 1.

In an intermediate step shown in FIGS. 5a and 5b, a collar of gathered fabric is formed proximate the end. In a preferred embodiment, the gathered fabric is formed by folding and stitching four tucks in the fabric along the fold and stitch lines, respectively, designate thereon. The longitudinal length of the tucks, and intermediate length of the collar, is identified by reference letter "A". The radial or widthwise dimension of the tucks is identified by reference letter "B". The width of the collar is identified by reference letter "C". Preferably, the width of the tucks "B" is chosen so that the width of the collar "C" approximates the diameter of the filter bag 1 when the filter bag expands from its flat shape shown in FIGS. 4-6 to a cylindrical shape by hanging in the bag house (the "installed diameter"). The tucks are preferably arranged generally as shown in FIG. 5a in which all tucks and corresponding stitch lines are parallel with the longitudinal seam 2, all tucks are positioned within the bag interior at approximately equal spacing intervals, and two tucks are laterally opposed with the corresponding stitch lines approximately coincident with longitudinal seam 2. Excluding hem allowance, the longitudinal dimension "A" of the stitched tucks 3 is selected to be approximately two (2) times the length of the overlap "D", described below.

Figure 6A:
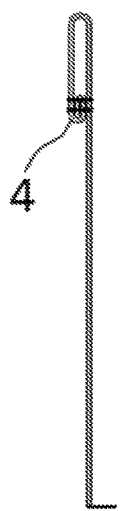
FIGS. 6a and 6b are a front elevational view and a top plan view, respectively, of the filtration bag of FIG. 1 in a final condition in accordance with the method of manufacturing by folding and stitching of one embodiment of the present invention.
Figure 6B:
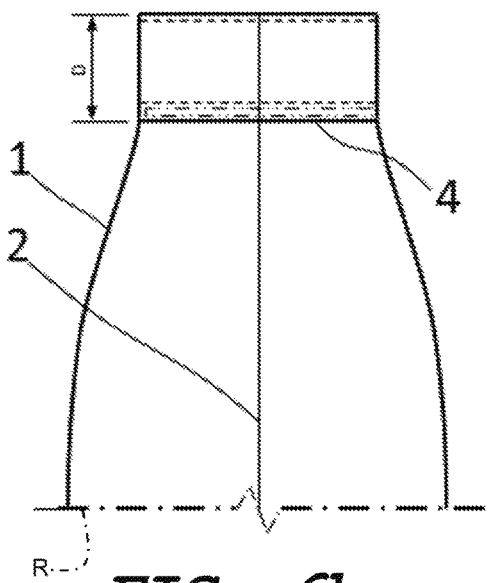

In a final step, show in FIGS. 6a and 6b, the fabric loop 10 is formed in the collar by folding the filter material along a lateral (perpendicular to the longitudinal seam 2) and stitching the fabric to itself along a lateral seam 4, which is approximately bifurcated by the longitudinal seam 2. After the final step, the longitudinal length of the collar is reduced to a final dimension D chosen such that the sum of the interior and exterior angles beta ($\beta$) and delta ($\delta$) shown in FIG. 2 is approximately 180 degrees.

Referring concurrently to FIGS. 1 and 7, the suspension tube 4 and hanger 5 are constructed of a metallic, composite or thermoplastic material selected for superior resistance to corrosion, deflection and deterioration in flue gas containing the solid, liquid and gaseous by-products of the combustion and FGD process. Such by-products include fly ash, partially burned fuel and various compounds of sulfur, chlorine, calcium, sodium and oxygen. The diameter of the suspension tube 4 is selected to minimize stress concentration in the fabric and stitching of filter bag 1. The tube 4 accepts the cross member 5b of the hanger 5 which includes side arms 5a and 5b. The length "E" of suspension tube 4 is selected to approximate the installed diameter of filter bag 1.

The hanger 5 is constructed and arranged to minimize stress concentration within suspension tube 4. The hanger 5 is also constructed and arranged to be rapidly inserted or removed from within the suspension tube 4 without contact, removal or other disturbance of filter bag 1. To facilitate this latter function, the cross member 5b of the hanger 5 can be easily inserted and removed from the tube 10 by opening and closing the releasable joint 8. Since the hook 8a and catch 8b are integrally formed from the hangar, which is made from a heavy gauge metal wire, the construction of the releasable joint is very simple and strong. One of the unique advantages of this construction is that a damaged or corroded hanger can be easily and quickly replaced with another hangar by passing the replacement hanger through the suspension tube prior to removing the corroded hangar. The weight of the filter bag 1 can then be supported by the replacement hanger before the corroded hanger is removed. This design feature avoids the need for taking down the bag as required by the suspension systems of the prior art.

Figure 8:
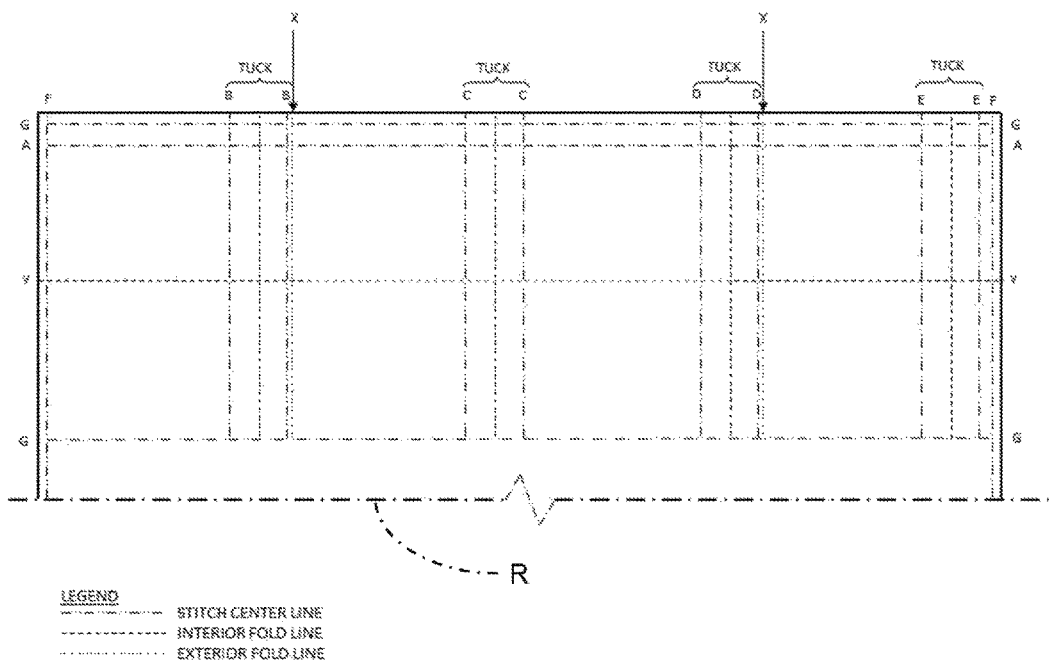
FIG. 8 is a pattern layout showing the fold lines and stitching lines on the filtration bag in accordance with the method of manufacturing by folding and stitching of one embodiment of the present invention.

A fold and stitch pattern in accordance with a preferred embodiment of the invention is shown in FIG. 8 and can be used to manufacture the filter bag 1 shown in FIGS. 1-7 and 9. Construction of the bag according to this pattern or its equivalent is important to the optimal distribution of forces through the fabric as the geometry of the construction transitions from circular to linearly diametric. The legend included on this drawing identifies the stitch center lines and both interior and exterior fold lines.

Figure 9A:
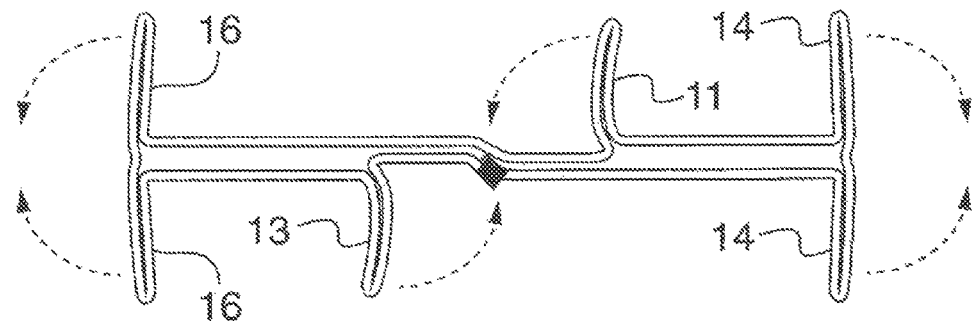
FIGS. 9a and 9b are plan views which illustrate the formation of tucks on the filtration bag by pleating and folding in accordance with the method of manufacturing of one embodiment of the present invention.
Figure 9B:
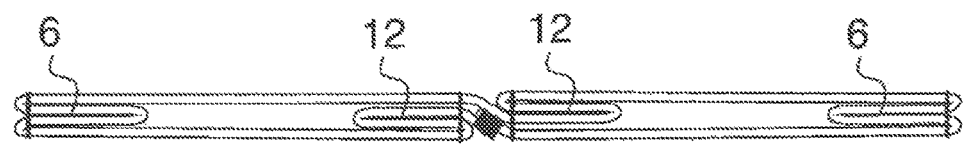

FIG. 9a illustrates a plurality of preliminary pleats formed in the filter fabric that are necessary to form the tucks described above. With the filter fabric held more or less along a straight line, the filter fabric is first gathered into opposite facing center pleats 11 and 13 and end pleats 14 and 16. The end pleats 14 and 16 are rotated (as shown by rotational direction arrows) into a configuration abutting one another and are sewn together forming end tucks 6. The center pleats are then rotated (as shown by rotational direction arrows) into a configuration abutting the rest of the filter fabric and then sewn to form opposite facing center tucks 12. Once sewn together, the preliminary collar has the cross sectional configuration shown in FIG. 9b, which is an enlarged cross-sectional view of FIG. 5a.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A suspendable filter bag made of a woven fabric, the filter bag comprising:
   a lower portion having a substantially circular cross section formed by wrapping the woven fabric and connecting opposite sides along a longitudinal seam, wherein the lower portion includes an opening for receiving unfiltered flue gas; and
   an upper portion having a substantially linear cross section formed by creating four internal tucks of overlapping woven fabric, wherein the four internal tucks include two end tucks formed on opposed outboard edges of the woven fabric and two center tucks formed on opposite sides of the longitudinal seam, wherein the upper portion includes a lateral loop open on opposite ends formed by folding an upper edge of the upper portion and connecting it to the woven fabric along a lateral seam of the upper section.

2. The filter bag of claim 1, wherein
   the lower portion has an installed diameter; and
   lateral width of the four internal tucks is equal and chosen so that lateral width of the linear cross section of the upper portion approximates the installed diameter of the lower portion.

3. The filter bag of claim 1, wherein the upper edge of the upper portion is stitched to the woven fabric along the lateral seam of the upper section.

4. The filter bag of claim 1, wherein the opposite sides of the woven fabric are stitched together along the longitudinal seam.

5. The filter bag of claim 1, wherein the lateral seam is substantially bifurcated by the longitudinal seam.

6. The filter bag of claim 1, wherein
   each of the two end tucks include a pair of outward rotated end pleats stitched together along longitudinal stitch lines that are substantially parallel to the longitudinal seam; and
   each of the two center tucks include an inward rotated center pleat stitched to the woven fabric along longitudinal stitch lines that are substantially parallel to the longitudinal seam.

7. The filter bag of claim 6, wherein length of the longitudinal stitch lines approximate two times longitudinal length of the lateral loop.

8. The filter bag of claim 1, wherein longitudinal length of the lateral loop is selected such that sum of exterior angle between the fabric loop and remainder of upper portion and interior angle associated with remainder of upper section below the lateral loop is approximately 180 degrees.

9. The filter bag of claim 1, wherein the upper portion is configured to minimize stress at transition from the substantially circular cross section of the lower portion to the substantially linear cross section of the upper portion.

10. The filter bag of claim 1, further comprising a tube placed within the lateral loop.

11. The filter bag of claim 1, further comprising a substantially triangular filter bag hanger having two side arms extending from an apex and a cross member extending between opposing ends of the two side arms, wherein one end of the cross member and one end of one of the two side arms are releasably connected via a releasable joint, wherein the cross member is to traverse the lateral loop of the filter bag to suspend the filter bag from a static structure.

12. The filter bag of claim 1, wherein the lower portion includes a plurality of circular rings connected to the woven fabric to provide the substantially circular cross section.

13. A suspendable filter bag system, the system comprising:
   a filter bag made of a woven fabric having
      a lower portion having a substantially circular cross section formed by wrapping the woven fabric and connecting opposite sides along a longitudinal seam, wherein the lower portion includes an opening for receiving unfiltered flue gas; and
      an upper portion having a substantially linear cross section formed by creating four internal tucks of overlapping woven fabric, wherein the four internal tucks include two end tucks formed on opposed outboard edges of the woven fabric and two center tucks formed on opposite sides of the longitudinal seam, wherein the upper portion includes a lateral loop open on opposite ends formed by folding an upper edge of the upper portion and connecting it to the woven fabric along a lateral seam of the upper section; and a substantially triangular filter bag hanger having two side arms extending from an apex and a cross member extending between opposing ends of the two side arms, wherein one end of the cross member and one end of one of the two side arms are releasably connected via a releasable joint, wherein the cross member is to traverse the lateral loop of the filter bag.

14. The filter bag system of claim 13, wherein
the one end of the one of the two side arms includes a first hook; and
the one end of the cross member includes a second hook perpendicular to the first hook.

15. The filter bag system of claim 13, wherein
the cross member is to be inserted or removed from the lateral loop when the one end of the cross member and one end of one of the two side arms are released from one another; and
the substantially triangular filter bag hanger is to suspend the filter bag from a static structure when the cross member is traversing the lateral loop and the one end of the cross member and one end of one of the two side arms are connected to one another.

16. The filter bag hanger of claim 15, wherein the static structure is a portion of a flue gas bag house.

17. The filter bag system of claim 13, further including a tube resistant to deflection located within the lateral loop, wherein the cross member is to traverse the tube.

18. A method for making a suspendable woven fabric filter bag, the method comprising
laying a woven fabric so as to have two opposing parallel sides that overlap along a centered longitudinal seam;
connecting the overlapping sides of the woven fabric to create a substantially circular cross sectional lower portion of the filter bag;
gathering the woven fabric into a pair of opposite facing longitudinal center pleats and a pair of end pleats on opposite ends thereof;
rotating each of the pair of end pleats outward into a configuration where an upper and a lower portion of the end pleats abut one another;
sewing each of pair of the abutting end pleats together to form a pair of end tucks;
rotating the pair of opposite facing longitudinal center pleats inward toward the centered longitudinal seam into a configuration where the center pleats abut other portions of the woven fabric;
sewing each of the pair of center pleats to the other portions of woven fabric to form a pair of opposite facing center tucks, wherein the pair of end tucks and the pair of center tucks form a preliminary color at an upper portion of the filter bag;
folding a top end of the preliminary collar over to form a lateral loop; and
connecting the top end of the preliminary collar to other portions of the upper portion along a lateral seam.

19. The method of claim 18, further comprising selecting a lateral width of the pair of end tucks and the pair of center tucks to be equal and result in lateral width of the preliminary color approximating an installed diameter of the lower portion.

20. The method of claim 18, further comprising
inserting a tube resistant to deflection in the lateral loop;
inserting a cross member of a substantially triangular hanger into the tube, wherein the hanger includes two side arms extending from an apex and the cross member extending between opposing ends of the two side arms, wherein one end of the cross member and one end of one of the two side arms are releasably connected via a releasable joint;
securing the releasable joint; and
securing the hanger to a static structure.

* * * * *